United States Patent
Chang et al.

(10) Patent No.: US 7,995,335 B2
(45) Date of Patent: Aug. 9, 2011

(54) ELECTRONIC DEVICE WITH REPLACEABLE DRIVE BRACKET

(75) Inventors: Hung-Chieh Chang, Taipei Hsien (TW);
Chen-Lu Fan, Taipei Hsien (TW);
Li-Ping Chen, Tiapei Hsien (TW);
Yi-Lung Chou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 133 days.

(21) Appl. No.: 12/492,493

(22) Filed: Jun. 26, 2009

(65) Prior Publication Data
US 2010/0238618 A1   Sep. 23, 2010

(30) Foreign Application Priority Data
Mar. 17, 2009   (CN) .................. 2009 2 0301333 U

(51) Int. Cl.
*G06F 1/16*       (2006.01)
*H05K 7/16*       (2006.01)
*A47B 81/00*      (2006.01)
*A47F 7/00*       (2006.01)

(52) U.S. Cl. ......... 361/679.33; 361/679.31; 361/679.37; 361/725; 361/726; 312/223.1; 312/223.2; 211/26

(58) Field of Classification Search .. 361/679.31–679.4, 361/724–727, 679.01–679.45, 679.55–679.59; 312/223.1, 223.2; 211/26
See application file for complete search history.

(56) References Cited

U.S. PATENT DOCUMENTS

| | | | |
|---|---|---|---|
| 7,523,901 B2 * | 4/2009 | Wu et al. ................. | 248/225.21 |
| 7,733,640 B2 * | 6/2010 | Huang ..................... | 361/679.33 |
| 2007/0233781 A1 * | 10/2007 | Starr et al. .................... | 709/203 |
| 2009/0002934 A1 * | 1/2009 | Carlson et al. ................ | 361/684 |

* cited by examiner

*Primary Examiner* — Jayprakash N Gandhi
*Assistant Examiner* — Nidhi Desai
(74) *Attorney, Agent, or Firm* — D. Austin Bonderer

(57) ABSTRACT

A system for housing storage devices in an electronic device includes a first drive bracket, a second drive bracket; and a chassis having the first or the second drive bracket installed therein. The first drive bracket defines a plurality of first rooms for accommodating first disk drives therein. The second drive bracket defines a plurality of second rooms for accommodating second disk drives therein. The first disk drives are sized different from the second disk drives.

15 Claims, 4 Drawing Sheets

ELECTRONIC DEVICE WITH REPLACEABLE DRIVE BRACKET

BACKGROUND

1. Technical Field

The present disclosure relates to an electronic device with replaceable drive bracket for accommodating hard disk drives of varying sizes.

2. Description of Related Art

Electronic devices, such as computers and servers, include at least one non-volatile storage device. Examples include hard disk drives (HDD), CD ROMs, and the like. Data and/or programs can be stored on such devices and remains there even if the computers or the servers are powered off. For the sake of simplicity, the following disclosure refers to HDDs, but relates generally to any type of storage device.

As is also well known, the memory capacity of an HDD is often dictated by the physical size of the HDD. That is, as magnetic elements used to store the data are increased in physical size or number, the capacity to store data is correspondingly increased. Thus, different brackets for different sizes of HDDs are desired to install the desired size of HDDs in computers and servers.

DETAILED DESCRIPTION OF THE EMBODIMENTS

Figure 1:
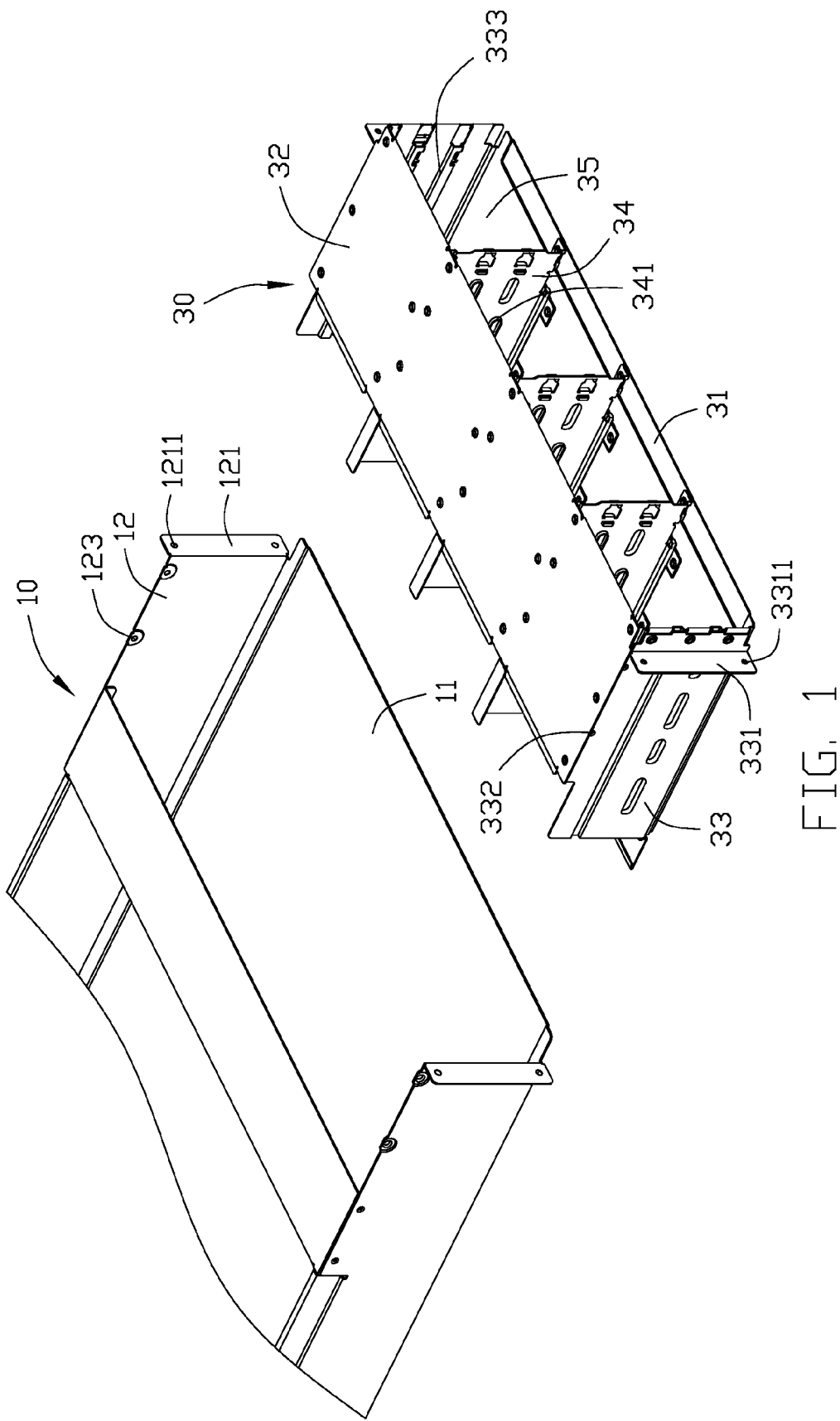
FIG. 1 is an isometric, exploded view of an electronic device, the electronic device including a chassis and a first drive bracket for accommodating first disk drives therein.
Figure 2:
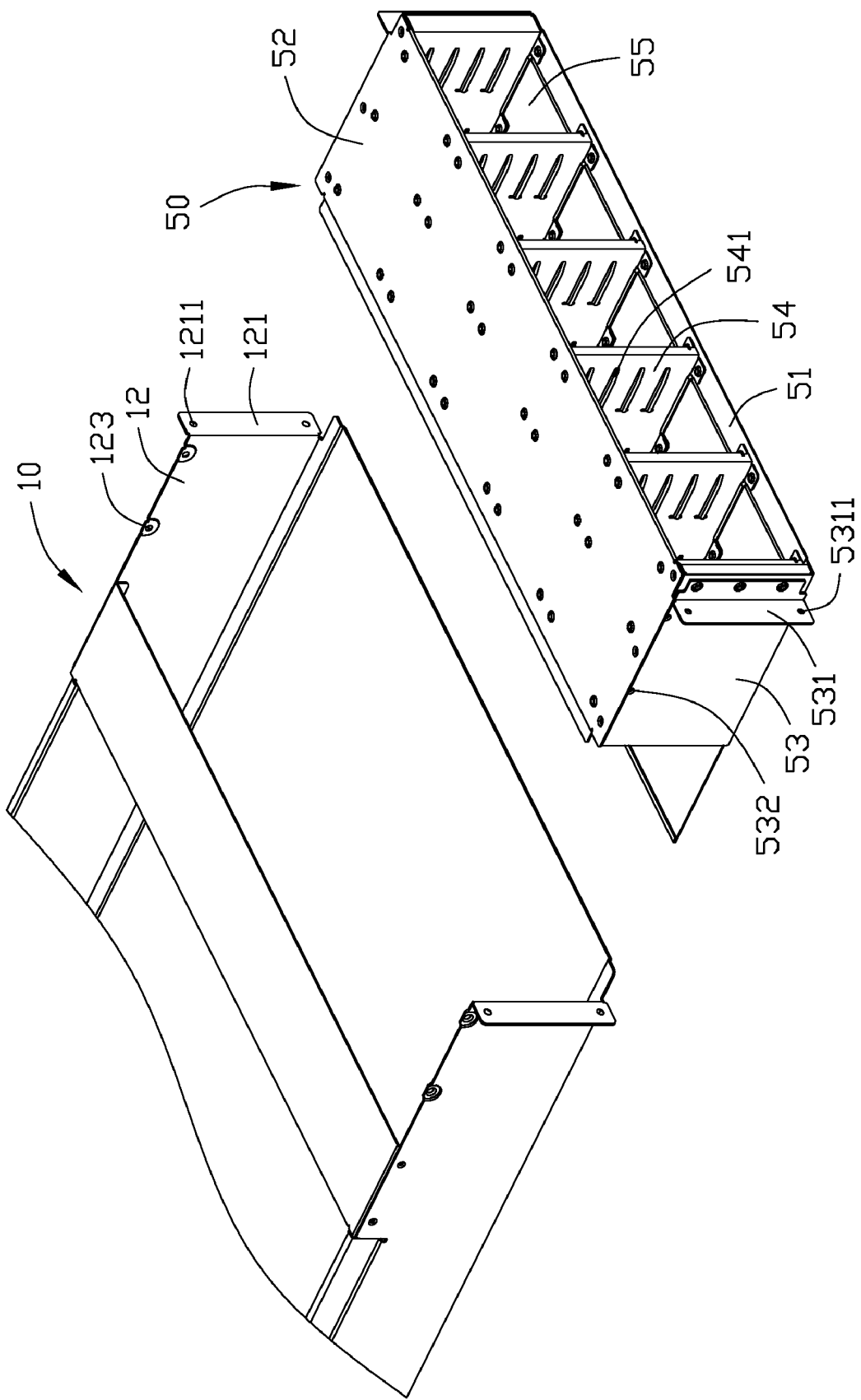
FIG. 2 is an isometric, exploded view of an electronic device, the electronic device including a chassis and a second drive bracket for accommodating second disk drives therein.

Referring to FIGS. 1 and 2, an embodiment of an electronic device includes a chassis 10, and a first drive bracket 30 or a second drive bracket 50 installable in the chassis 10 for holding disk drives therein. The first drive bracket 30 is capable of holding a plurality of first disk drives therein. The second drive bracket 50 is capable of holding a plurality of second disk drives therein. The first disk drives are sized different from the second disk drives. In the embodiment, the electronic device is a server. The first disk drives are 3.5" HDDs, and the second disk drives are 2.5" HDDs.

The chassis 10 includes a bottom panel 11 and a pair of side panels 12 extending perpendicularly upwardly from opposite sides the bottom panel 11. A pair of limiting protrusions 123 protrudes inwardly from a top portion of each of the side panels 12. A flange 121 is bent perpendicularly outwards from a front edge of each of the side panels 12. A pair of securing holes 1211 is defined in the flange 121 of each of the side panels 12.

The first drive bracket 30 includes a first bottom panel 31, a first top panel 32, and a pair of first side panels 33 connecting the first bottom panel 31 to the first top panel 32. Three first dividing panels 34 parallel to the first side panels 33 are disposed in the first drive bracket 30, thus forming four equal sized first rooms 35 in the first drive bracket 30. A pair of parallel supporting rails 333 protrudes inwardly from each of the side panels 33. Each of the first dividing panels 34 defines two rows of first supporting protrusions 341 protruding from a surface thereof. Then each of the first rooms 35 is capable of holding three first disk drives therein. The first disk drives are supportable by the first supporting protrusions 341 and/or the supporting rails 333. A first flange 331 is bent from each of the first side panels 33 corresponding to the flange 121 of the chassis 10. Each of the first flanges 331 defines a pair of first securing holes 3311 therein corresponding to the securing holes 1211 of the chassis 10. Each of the first side panels 33 defines a pair of first limiting recesses 332 therein corresponding to the limiting protrusions 123 of the chassis 10.

The second drive bracket 50 has a structure similar to the first drive bracket 30. An outer enclosure of the first drive bracket 30 is equal in size to the second drive bracket 50. The second drive bracket 50 includes a second bottom panel 51, a second top panel 52, and a pair of second side panels 53 connecting the second bottom panel 51 to the second top panel 52. Four second dividing panels 54 parallel to the second side panels 53 are disposed in the second drive bracket 50, thus forming five equal sized second rooms 55 in the second drive bracket 50. The second rooms 55 are smaller than the first rooms 35 of the first drive bracket 30. Four rows of second supporting protrusions 541 are regularly formed on the second dividing panels 54 and the second side panels 53. Thus, each of the second rooms 55 is capable of holding five second disk drives therein due to the supporting of the second supporting protrusions 541. A second flange 531 protrudes perpendicularly outwards from each of the second side panels 53 corresponding to the flange 121 of the chassis 10. Each of the second flanges 531 defines a pair of second securing holes 5311 therein corresponding to the securing holes 1211 of the chassis 10. Each of the second side panels 53 defines a pair of second limiting recesses 532 therein corresponding to the limiting protrusions 123 of the chassis 10.

Figure 3:
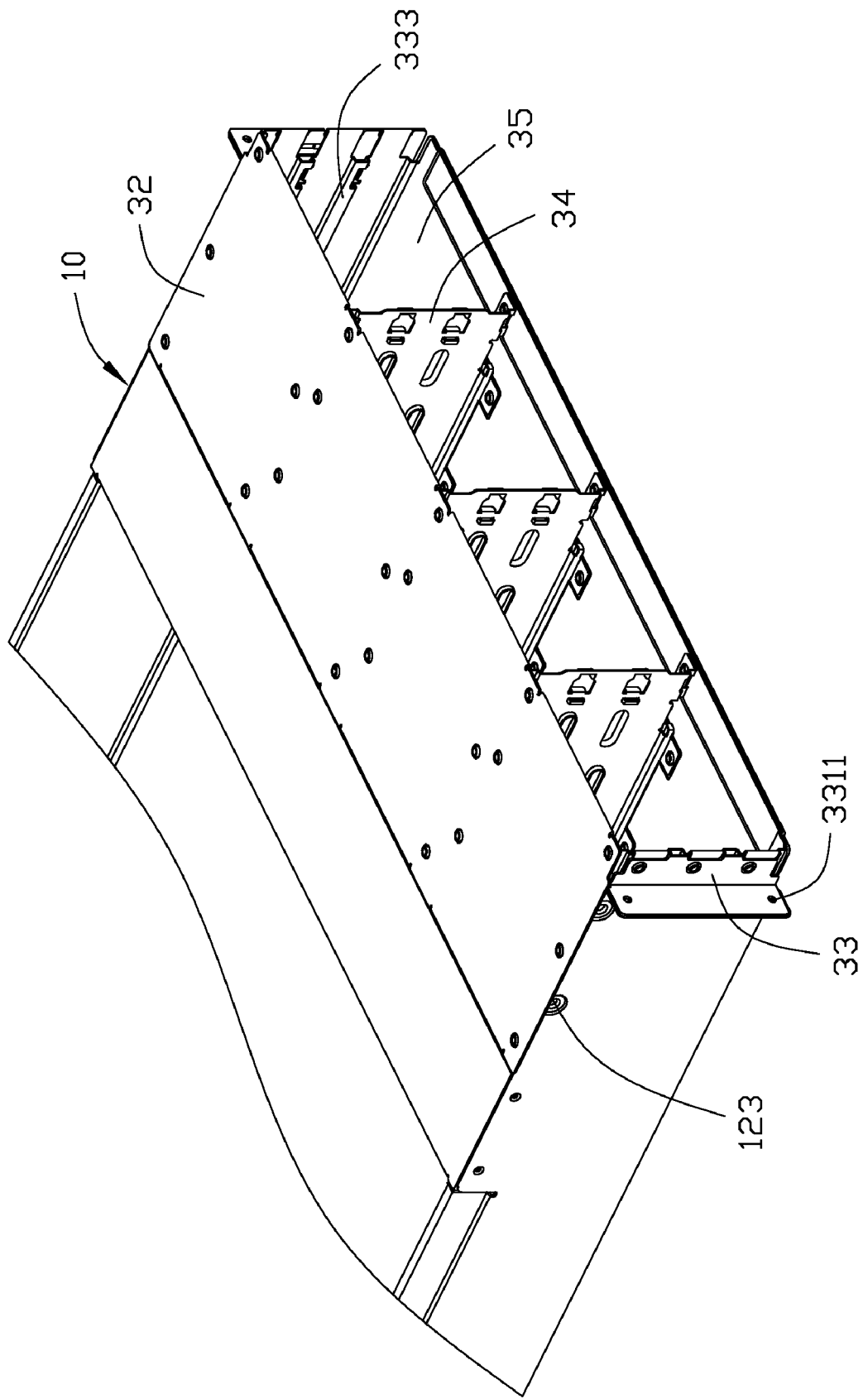
FIG. 3 is an assembled view of FIG. 1.

Referring to FIG. 3, in assembly, if the first disk drives are desired to be installed in the electronic device, the first drive bracket 30 is attached to the chassis 10. The limiting protrusions 123 of the chassis 10 engage with the first limiting recesses 332 of the first side panels 33 of the first drive bracket 30. The first securing holes 3311 of the first drive bracket 30 align with the securing holes 1211 of the chassis 10. Then the first drive bracket 30 can be screwed to the chassis 10 for installing the first disk drives in the chassis 10.

Figure 4:
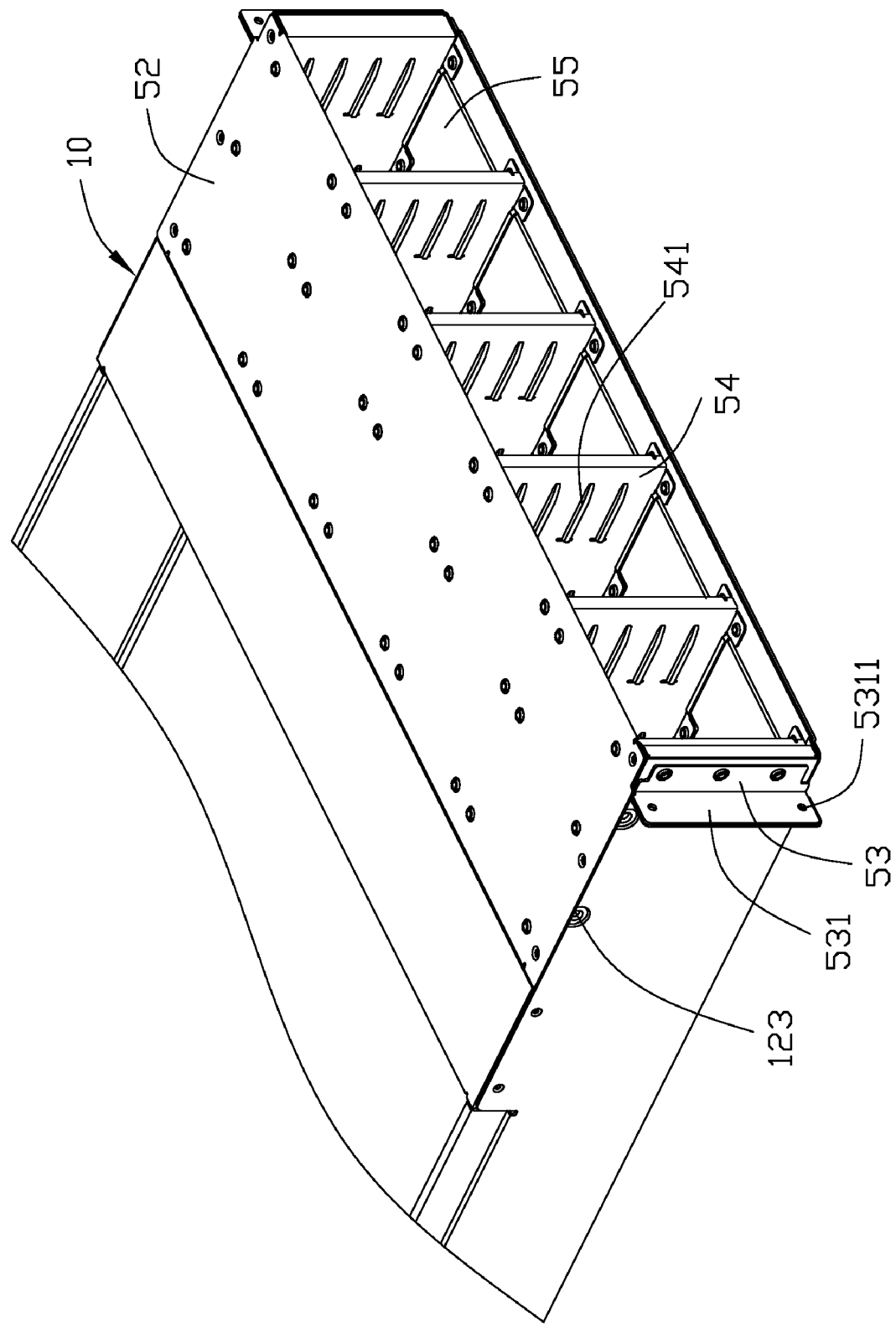
FIG. 4 is an assembled view of FIG. 2.

Referring to FIG. 4, if the second disk drives are desired to be installed in the electronic device, the first drive bracket 30 is removed from the chassis 10. The second drive bracket 50 is secured to the chassis 10 for installing the second disk drives.

While the present embodiments have been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A system for housing storage devices in an electronic device comprising: a first drive bracket and a second drive bracket; and a chassis having the first or the second drive bracket installed therein, the first drive bracket defining a plurality of first rooms for accommodating first disk drives therein; the second drive bracket defining a plurality of second rooms for accommodating second disk drives therein; wherein the first disk drives are sized different from the second disk drives, each of the plurality of second rooms is capable of accommodating a plurality of second disk drives therein; wherein a width of the first drive bracket is equal to that of the second drive bracket; wherein the first drive bracket comprises four first rooms, the second drive bracket comprises five second rooms; and wherein the first drive bracket comprises a first bottom panel, a first top panel parallel to the first bottom panel, a pair of first side panels connecting between the first bottom panel and the first top panel, and three first dividing panels attached to the first bottom panel and the first top panel and parallel to the first side panels to form the four first rooms.

2. The system of claim 1, wherein each of the first side panels defines a pair of parallel rails protruding inwardly therefrom, each side surface of each of the dividing panels defines two parallel rows of first supporting protrusions, each of the first rooms is capable of accommodating three first disk drives therein, the first disk drives are supported by the first supporting protrusions or the first supporting protrusions and the rails.

3. The system of claim 2, wherein a distance between the rails of one of the side panels is equal to that between the two rows of the first supporting protrusions of one of the first dividing panels.

4. The system of claim 3, wherein the first disk drives are 3.5" hard disk drives.

5. The system of claim 1, wherein the second drive bracket comprises a second bottom panel, a second top panel parallel to the second bottom panel, a pair of second side panels connecting between the second bottom panel and the second top panel, and four second dividing panels attached to the second bottom panel and the second top panel and parallel to the second side panels to form the five second rooms.

6. The system of claim 1, wherein the second disk drives are 2.5" hard disk drives.

7. A system for housing storage devices in an electronic device comprising: a chassis with a first drive bracket or a second drive bracket installed therein, the first drive bracket capable of accommodating at least a first disk drive therein, the second drive bracket capable of accommodating at least a second disk drive therein; wherein the first disk drive is sized different from the second disk drive; an outer enclosure of the first drive bracket is sized same as that of the second drive bracket; the first drive bracket comprises a plurality of first rooms, each of the first rooms is capable of accommodating a plurality of first disk drives therein; wherein the first drive bracket comprises four first rooms, each of the first rooms is capable of accommodating three first disk drives therein; wherein the first drive bracket comprises a first bottom panel, a first to panel parallel to the first bottom panel, a pair of first side panels connecting between the first bottom panel and the first to panel, and three first dividing panels attached to the first bottom panel and the first top panel and parallel to the first side panels to form the four first rooms.

8. The system of claim 7, wherein the first disk drives are 3.5" hard disk drives.

9. The system of claim 7, wherein each of the first side panels defines a pair of parallel rails protruding inwardly therefrom, each side surface of each of the dividing panels defines two parallel rows of first supporting protrusions, each of the first rooms is capable of accommodating three first disk drives therein, the first disk drives are supported by the first supporting protrusions or the first supporting protrusions and the rails.

10. The system of claim 9, wherein a distance between the rails of one of the first side panels is equal to that between the two rows of the first supporting protrusions of one of the first dividing panels.

11. The system of claim 7, wherein the second drive bracket comprises five second rooms, each of the second rooms is capable of accommodating five second disk drives therein.

12. The system of claim 11, wherein the second disk drives are 2.5" hard disk drives.

13. The system of claim 7, wherein the chassis comprises a pair of side panels, the first drive bracket comprises a pair of first side panels attached to inner sides of the side panels of the chassis when it is installed in the chassis, and the second drive bracket comprises a pair of second side panels attached to inner sides of the side panels of the chassis when it is installed in the chassis.

14. The system of claim 13, wherein a pair of limiting protrusions is formed at an upper portion of each of the side panels of the chassis, each of the first side panels of the first drive bracket comprises a pair of limiting recesses configured to engage with the protrusions of the chassis, and each of the second side panels of the second drive bracket comprises a pair of second limiting recesses configured to engage with the protrusions of the chassis.

15. A system for housing storage devices in an electronic device comprising: a chassis with a first drive bracket or a second drive bracket installed therein, the first drive bracket capable of accommodating at least a first disk drive therein, the second drive bracket capable of accommodating at least a second disk drive therein; wherein the first disk drive is sized different from the second disk drive; an outer enclosure of the first drive bracket is sized same as that of the second drive bracket; the first drive bracket comprises four first rooms, each of the first rooms is capable of accommodating three first disk drives therein; wherein the first drive bracket comprises a first bottom panel, a first top panel parallel to the first bottom panel, a pair of first side panels connecting between the first bottom panel and the first top panel, and three first dividing panels attached to the first bottom panel and the first top panel and parallel to the first side panels to form the four first rooms.

* * * * *